(12) United States Patent
Shiino et al.

(10) Patent No.: US 8,996,154 B2
(45) Date of Patent: Mar. 31, 2015

(54) ROBOT SYSTEM AND METHOD OF MANUFACTURING WORKPIECE

(75) Inventors: Takashi Shiino, Kitakyushu (JP); Keigo Ishibashi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 428 days.

(21) Appl. No.: 13/420,619

(22) Filed: Mar. 15, 2012

(65) Prior Publication Data

US 2013/0110275 A1 May 2, 2013

(30) Foreign Application Priority Data

Oct. 26, 2011 (JP) ................................. 2011-235203

(51) Int. Cl.
*G06F 19/00* (2011.01)
*B25J 11/00* (2006.01)

(52) U.S. Cl.
CPC ........................................ *B25J 11/00* (2013.01)
USPC .............................. 700/114; 414/217; 34/406

(58) Field of Classification Search
USPC ............................... 700/114; 414/217; 34/406
See application file for complete search history.

(56) References Cited

U.S. PATENT DOCUMENTS

| | | | |
|---|---|---|---|
| 5,862,586 A | 1/1999 | Kimura | |
| 2001/0041491 A1* | 11/2001 | Nishida et al. | 445/26 |
| 2002/0007618 A1* | 1/2002 | Armington et al. | 53/472 |
| 2005/0120578 A1* | 6/2005 | van der Meulen | 34/92 |
| 2005/0223837 A1* | 10/2005 | van der Meulen | 74/490.01 |
| 2005/0232727 A1* | 10/2005 | Ferrara | 414/217 |
| 2008/0085173 A1* | 4/2008 | van der Meulen | 414/222.07 |
| 2008/0097642 A1* | 4/2008 | Zwicker | 700/218 |
| 2012/0014769 A1* | 1/2012 | van der Meulen | 414/217 |
| 2012/0148374 A1* | 6/2012 | van der Meulen | 414/217 |
| 2013/0211593 A1* | 8/2013 | Domae et al. | 700/258 |

FOREIGN PATENT DOCUMENTS

| | | |
|---|---|---|
| CN | 1161896 | 10/1997 |
| CN | 1265628 | 9/2000 |
| CN | 101631427 | 1/2010 |
| JP | 59-201780 | 11/1984 |
| JP | 63-180485 | 7/1988 |
| JP | 05-042447 | 2/1993 |
| JP | 09-181489 | 7/1997 |
| JP | 2004-209576 | 7/2004 |
| JP | 2008-009899 | 1/2008 |
| JP | 2011-000669 | 1/2011 |
| JP | 2011-183472 | 9/2011 |

OTHER PUBLICATIONS

Japanese Decision of a Patent Grant for corresponding JP Application No. 2011-235203, Feb. 4, 2014.
Japanese Office Action for corresponding JP Application No. 2011-235203, Aug. 27, 2013.
Chinese Office Action for corresponding CN Application No. 201210194850.0, Sep. 1, 2014.

* cited by examiner

*Primary Examiner* — Robert Fennema
*Assistant Examiner* — Anthony Whittington
(74) *Attorney, Agent, or Firm* — Mori & Ward, LLP

(57) ABSTRACT

A robot system according to one aspect of an embodiment includes a robot and an instructing module. The robot holds one of a plurality of feed materials used for processing a workpiece. The instructing module gives instructions to the robot, when the feed materials are used for processing the single workpiece, for an operation in which the feed material held last in the previous round of processing a workpiece is used first in the subsequent round of processing a workpiece.

5 Claims, 14 Drawing Sheets

| CIRCUIT BOARD TYPE | TAPE TYPE | TEACHING DATA SET | ... |
|---|---|---|---|
| α | A | a→b→c | ... |
| α | B | d→e | ... |
| β | A | f→g | ... |
| β | C | h | ... |
| ⋮ | ⋮ | ⋮ | ... |

| STOCKER HOLDER No. | TAPE TYPE | REMAINING AMOUNT [mm] | THRESHOLD [mm] | ... |
|---|---|---|---|---|
| 1 | A | 20000 | 2000 | ... |
| 2 | B | 30000 | 2000 | ... |
| 3 | C | 40000 | 2000 | ... |
| 4 | A | 50000 | 2000 | ... |
| ⋮ | ⋮ | ⋮ | ⋮ | ⋮ |

ROBOT SYSTEM AND METHOD OF MANUFACTURING WORKPIECE

CROSS-REFERENCE TO RELATED APPLICATION

This application is based upon and claims the benefit of priority of the prior Japanese Patent Application No. 2011-235203, filed on Oct. 26, 2011, the entire contents of which are incorporated herein by reference.

FIELD

The embodiment discussed herein is directed to a robot system and a method of manufacturing a workpiece.

BACKGROUND

Various technologies have been developed to automate a production line for workpieces by replacing manual labors with robots. For example, Japanese Patent Application Laid-open No. 2008-009899 discloses an automatic teaching system for automatically teaching assembling work to an assembling work robot.

The automatic teaching system individually identifies various types of components randomly collected (hereinafter, referred to as workpieces) by using photographic images taken by a camera, for example, and compares them with correlate information of workpieces registered in advance so as to automatically generate a given procedure of assembling work per assembly.

However, conventional robot systems have room for improvement for enhancing throughput. For example, when a given procedure that the above-described automatic teaching system generates includes change of tools or materials to be held by the robot, the operation of the robot required for the change is likely to become a large overhead as the number of workpieces to manufacture increases.

SUMMARY

A robot system according to one aspect of an embodiment includes a robot and an instructing module. The robot holds one of a plurality of feed materials used for processing a workpiece. The instructing module gives an instruction to the robot, when the feed materials are used for processing the single workpiece, for an operation in which the feed material held last in a previous round of processing a workpiece is used first in a subsequent round of processing a workpiece.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

With reference to the accompanying drawings, an embodiment of a robot system and a method of manufacturing a workpiece disclosed in the present application will be described in detail hereinafter. However, the embodiment is not intended to be restricted by the embodiment described.

In the following, with masking tapes as feed materials and a circuit board for an electronic device as a subject of processing, a robot system that carries out a process of affixing masking tapes to predetermined positions on the circuit board will be exemplified.

The circuit board will now be described. The circuit board in the present robot system is a circuit board before being provided with electronic components. After the masking tapes are affixed at predetermined positions in the present robot system, solder is applied to the parts not masked in the subsequent process of soldering process. In the following, the circuit board may be referred to as a workpiece.

Overall Configuration

Figure 1:
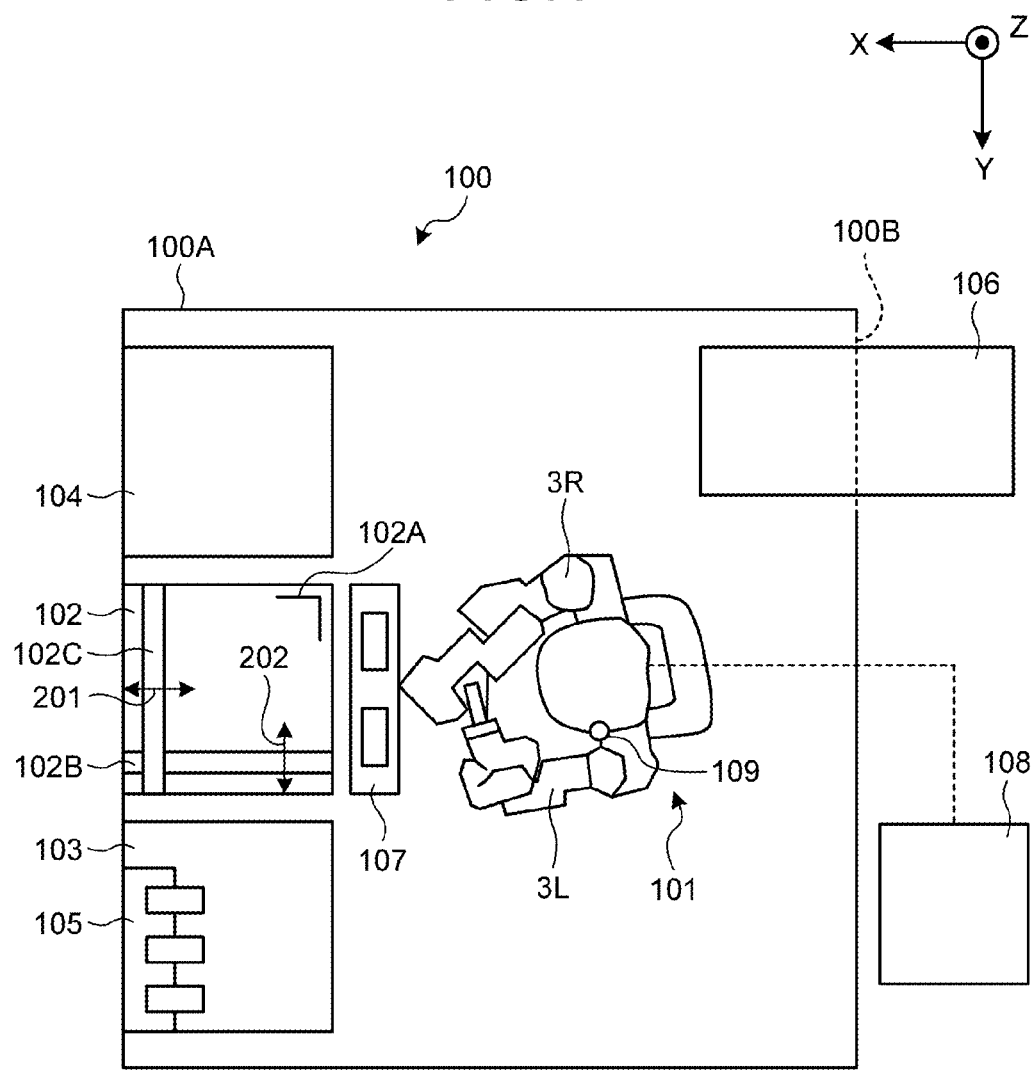
FIG. 1 is a top view schematically illustrating an overall configuration of a robot system according to an embodiment.

FIG. 1 is a top view schematically illustrating an overall configuration of a robot system 100 according to the embodiment. In FIG. 1, to make the explanation easier to understand, a three-dimensional orthogonal coordinate system including a Z-axis with a vertical upward direction as a positive direction is indicated. Such an orthogonal coordinate system may be indicated in other drawings used in the following explanation. Furthermore, a positive direction of an X-axis is defined to point the front of a robot 101 in the following.

As illustrated in FIG. 1, the robot system 100 includes the robot 101, a stage 102, an unprocessed work cassette 103, a processed work cassette 104, a main stocker 105, a sub-stocker 107, and a camera 109 that are arranged at predetermined positions inside a partition wall 100A.

On the partition wall 100A, a gate 100B is provided, and a carry-in carry-out path 106 is arranged inside and outside of the partition wall 100A through the gate 100B. On the outside of the partition wall 100A, a control device 108 is arranged and is connected to the robot 101 to communicate with the robot 101.

Configuration of Robot

Figure 2:
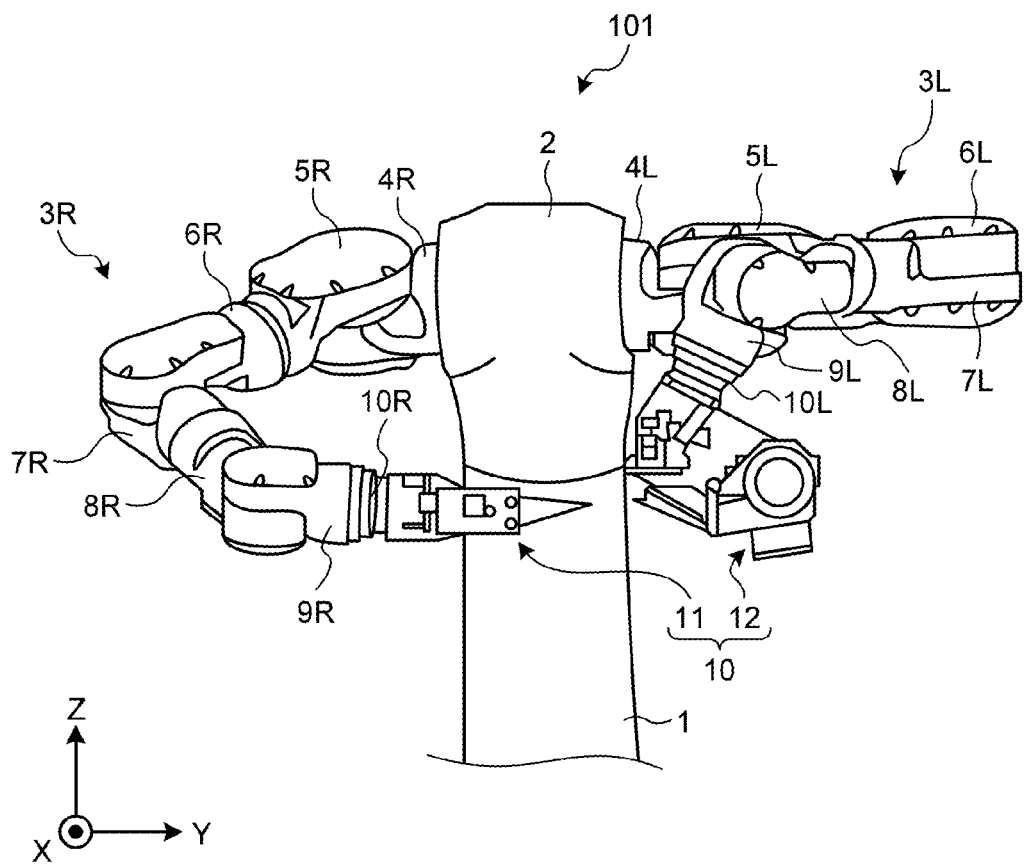
FIG. 2 is a front view schematically illustrating principal parts of the robot according to the embodiment.

The configuration of the robot 101 will be described with reference to FIG. 2. FIG. 2 is a front view schematically illustrating principal parts of the robot 101 according to the embodiment.

As illustrated in FIG. 2, the robot 101 with a base 1 thereof is secured to a floor by anchor bolts not depicted and, on the base 1, a body 2 is provided to rotate with respect to the base 1 via an actuator not depicted.

On the left and right sides of the body 2, a first arm 3L and a second arm 3R are provided, respectively. On the first arm 3L, a left shoulder unit 4L is provided to rotate along a vertical plane (see an X-Z plane in FIG. 2). On the left shoulder unit 4L, an upper left arm A unit 5L is further provided to swing.

At the end of the upper left arm A unit 5L, an upper left arm B unit 6L is provided. The upper left arm B unit 6L is given a twisting action to rotate. At the end of the upper left arm B unit 6L, a lower left arm unit 7L is provided to swing. At the end of the lower left arm unit 7L, a left wrist A unit 8L is provided, and at the end of the left wrist A unit 8L, a left wrist B unit 9L is provided.

As for the left wrist A unit 8L, a twisting action to rotate is given, and as for the left wrist B unit 9L, a rotating action that performs bending action is given. At the end of the left wrist B unit 9L, a left flange 10L is provided, and at the left flange 10L, a left hand unit (hereinafter, may be described as a first hand mechanism) 12 is attached.

The second arm 3R is bilaterally symmetric with the first arm 3L, and the second arm 3R is configured with a right shoulder unit 4R, an upper right arm A unit 5R, an upper right arm B unit 6R, a lower right arm unit 7R, a right wrist A unit 8R, a right wrist B unit 9R, and a right flange 10R. On the right flange 10R, a right hand unit (hereinafter, may be described as a second hand mechanism) 11 is attached.

Each of the moving units such as the rotating units and the swinging units of the robot 101 has an actuator (not depicted) built-in having a servo motor. The actuator further has an encoder built-in, and the encoder notifies the control device 108 of the rotational position of the respective moving units.

The detailed configurations of the right hand unit 11 and the left hand unit 12 will be discussed later. As illustrated in FIG. 2, the right hand unit 11 and the left hand unit 12 may be described as hands 10 collectively in the following.

Returning to the explanation with reference to FIG. 1, the stage 102 will be described. The stage 102 is disposed in front of the robot 101, and has a flat workbench where a workpiece is placed. At a corner portion of the workbench, a positioning wall 102A having a right angle is provided to stand thereon.

On the stage 102, provided is a moving member 102B that moves, by the drive of an actuator not depicted, to slide in a Y-axis direction (hereinafter, also referred to as a left-right direction) indicated by an arrow 202 in FIG. 1. Similarly, provided is a moving member 102C that moves to slide in the X-axis direction (hereinafter, also referred to as a front-back direction) indicated by an arrow 201 in FIG. 1.

The unprocessed work cassette 103 is a storage case provided with a plurality of slots where stacks of unprocessed circuit boards are stored. The processed work cassette 104 is a storage case provided with a plurality of slots where processed circuit boards are stored. The unprocessed work cassette may be renamed as a first storage, and the processed work cassette may be renamed as a second storage.

As illustrated in FIG. 1, the unprocessed work cassette 103 is disposed near the first arm 3L including the left hand unit 12 (see FIG. 2). The processed work cassette 104 is disposed near the second arm 3R including the right hand unit 11 (see FIG. 2).

In other words, this allows an unprocessed circuit board to be moved from the unprocessed work cassette 103 and placed on the stage 102 using the left hand unit 12, and then a processed circuit board to be moved from the stage 102 and placed on the processed work cassette 104 using the right hand unit 11. Accordingly, the robot 101 and the hands 10 can be efficiently operated, thereby allowing overhead to be reduced and throughput to be increased. Furthermore, it is not necessary to reserve working areas of the robot 101 and the hands 10 to be wide and thus, the reduction in working space can be achieved.

In addition to the above-described operations of moving and placing unprocessed circuit boards and processed circuit boards, the operations of the robot 101 and the hands 10 are instructed by a later described instructing module 108*ae* of the control device 108 (see FIG. 8). The instructing module 108*ae* will be described in detail with reference to FIG. 8 and the subsequent drawings.

The main stocker 105 is disposed in an area where the robot 101 can hold, for example, above the unprocessed work cassette 103. The main stocker 105 further has a plurality of holders, and each of the holders can store one of a plurality of types of winding roller mechanisms 38 (described later). On each winding roller mechanism 38, fitted is a winding roller 36 (described later) having one of a plurality of types of masking tape in different width dimensions, materials, and such.

The sub-stocker 107 is disposed at a location closer to the robot 101 than the main stocker 105 (in the example in FIG. 1, between the robot 101 and the stage 102). The sub-stocker 107 further has a plurality of holders. Each of the holders stores therein the winding roller mechanism 38 that is necessary corresponding to the type of circuit board and taken out in priority from the main stocker 105 in advance. Storing the mechanism in the sub-stocker 107 allows the working areas of the robot 101 and the hands 10 to be made small in affixing work, whereby the overhead can be reduced.

The control device 108 is configured with a computer having a storage device, an arithmetic processing unit, an input device, and such (none depicted), and is connected to the robot 101 to intercommunicate with each other.

On the control device 108, aspects of processing operation performed on a circuit board (more specifically, information of affixing which type of masking tape onto which location on the circuit board and such) are registered as teaching data in advance through the input device (for example, a programming pendant and the like).

The control device 108 then generates and outputs an operating signal that operates each of the moving units of the robot 101 based on the registered teaching data. The detailed configuration of the control device 108 will be discussed later with reference to FIG. 8.

To simplify the explanation, a single control device 108 is illustrated in the present embodiment. However, the control device 108 may be configured with a plurality of individual devices separately controlling the robot 101 and the hands 10, while the respective devices communicating with one another.

The camera 109 is an imaging device suspended above the robot 101 to take an image of a circuit board placed on the stage 102. While FIG. 1 illustrates a situation in which the camera 109 is disposed at the tip of the shoulder of the robot 101, it is not intended to restrict the disposed location of the camera 109. Furthermore, without suspending the camera 109, other installation method may be used.

Configuration of Second Hand Mechanism

Figure 3A:
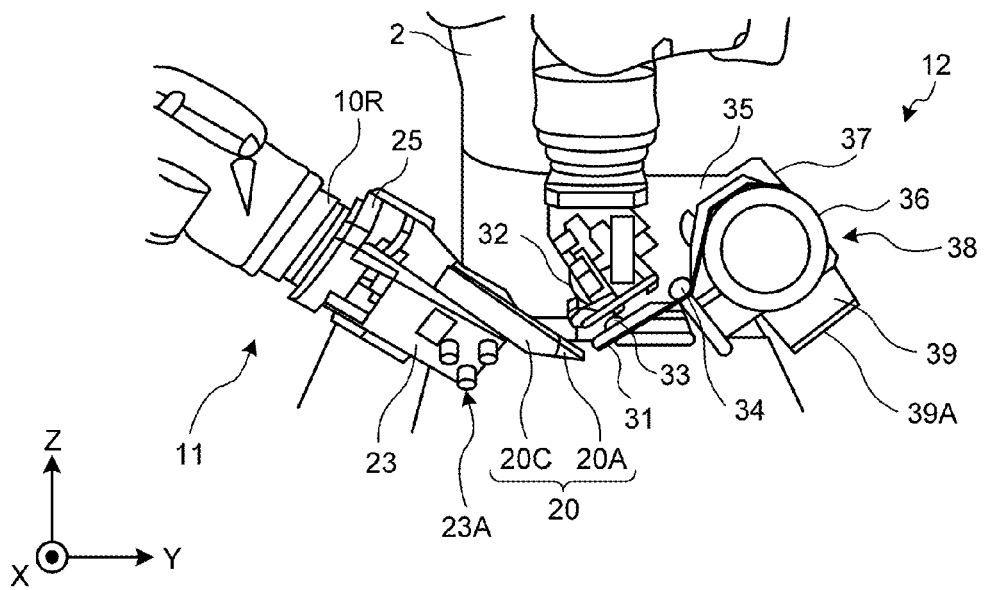
FIG. 3A is a front view schematically illustrating principal parts of a right hand unit and a left hand unit according to the embodiment.
Figure 3B:
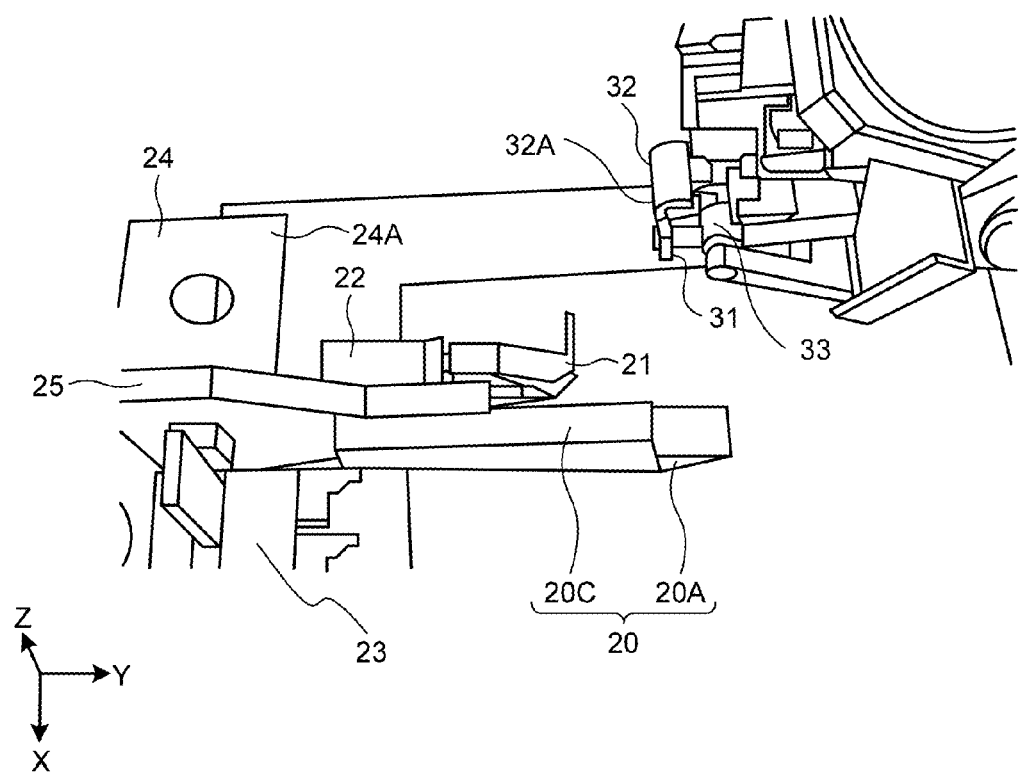
FIG. 3B is a perspective view schematically illustrating principal parts of the right hand unit and the left hand unit according to the embodiment.
Figure 4:
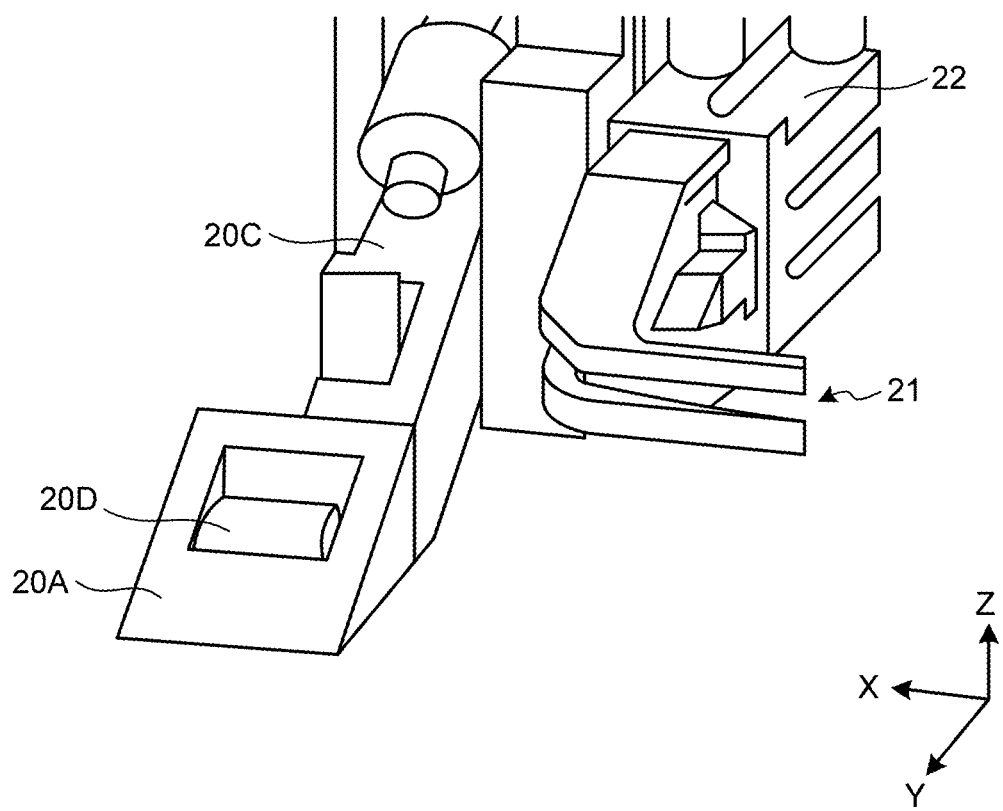
FIG. 4 is a schematic diagram illustrating an end part of the right hand unit.

Next, the more detailed configuration of the right hand unit 11 will be described with reference to FIGS. 3A, 3B, and 4. FIG. 3A is a front view schematically illustrating the principal parts of the right hand unit 11 and the left hand unit 12 according to the embodiment, and FIG. 3B is a perspective view schematically illustrating the principal parts of the right hand unit 11 and the left hand unit 12 according to the embodiment. FIG. 4 is a schematic diagram illustrating an end part of the right hand unit 11.

As illustrated in FIGS. 3A and 3B, the right hand unit 11 includes a pressing mechanism 20, a second holding mechanism 21, an actuator 22, an unprocessed work holding mechanism 23, a processed work holding mechanism 24, and a bracket 25.

The bracket 25 is secured to the right flange 10R, and the pressing mechanism 20, the second holding mechanism 21, the actuator 22, the unprocessed work holding mechanism 23, and the processed work holding mechanism 24 are separately attached to the bracket 25.

The pressing mechanism 20 is configured with a pressing claw 20A and a base part 20C, and the base part 20C secured to the bracket 25 is provided extending in a direction approximately the same as the rotation axis of the right flange 10R.

At the end of the base part 20C, the pressing claw 20A is arranged towards the extending direction of the base part 20C. The pressing claw 20A is formed in a triangular prism shape with the tip thereof having an acute angle, and the base end thereof is secured to the base part 20C.

The base part 20C is formed of a hard material such as metal, and the pressing claw 20A is formed of a soft material such as resin.

As illustrated in FIG. 4, on the pressing claw 20A, a driven roller 20D is pivotally supported to slightly protrude on the side where the pressing claw 20A makes contact with a masking tape. The driven roller 20D driven-rotates corresponding to changes in relative position with respect to a circuit board or a masking tape when the right hand unit 11 moves while pressing the masking tape onto the circuit board as described later.

The second holding mechanism 21 is provided in parallel with the base part 20C of the pressing mechanism 20, and is a forceps-like member formed with the leading end part thereof bent at an approximately right angle. The second holding mechanism 21 is further connected to the actuator 22 at the base end part thereof, and is designed to hold a masking tape by nipping or to release it by the drive of the actuator 22 switching to hold or to release the hold, respectively.

As illustrated in FIG. 3A, the unprocessed work holding mechanism 23 has a plurality of suction members 23A (three pieces, here), and carries out holding a circuit board and releasing the hold by the suction members 23A sucking the top surface of the circuit board and releasing the suction, respectively.

As illustrated in FIG. 3B, the processed work holding mechanism 24 is a tabular member secured to the bracket 25, and is formed with an engaging part 24A having a bend at the end thereof. Meanwhile, a circuit board is provided with a hole formed, and operating the second arm 3R to make the engaging part 24A engage with the hole of the circuit board allows holding the processed circuit board.

Consequently, the circuit board can be held without contacting the surface of the circuit board on which masking tapes are affixed, whereby the masking tapes affixed on the processed circuit board can be prevented from being stained and such.

Configuration of First Hand Mechanism

Figure 5A:
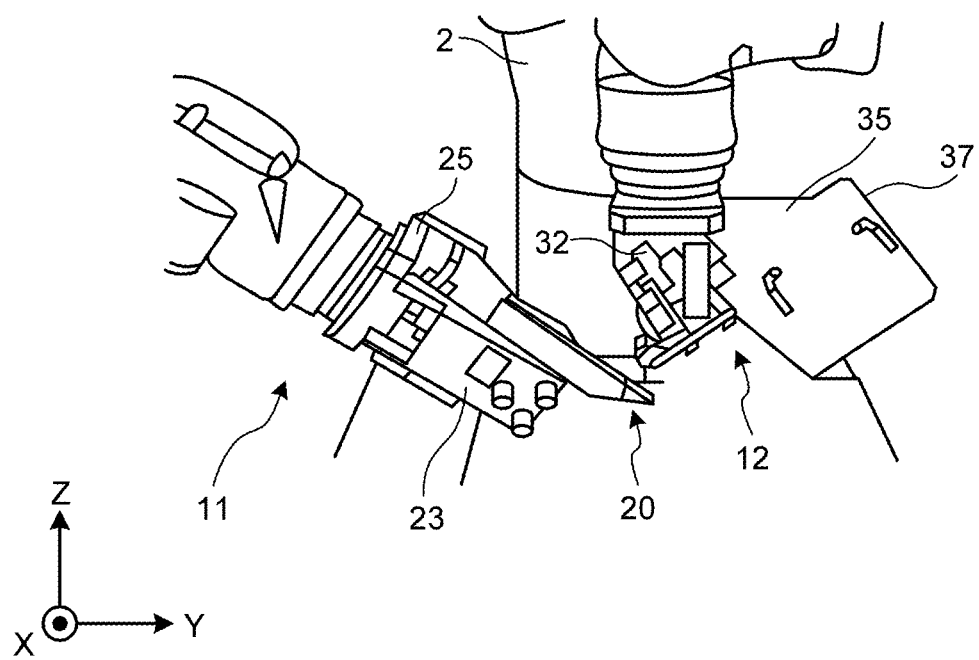
FIG. 5A is a schematic diagram illustrating a condition of a winding roller mechanism being removed from the left hand unit.
Figure 5B:
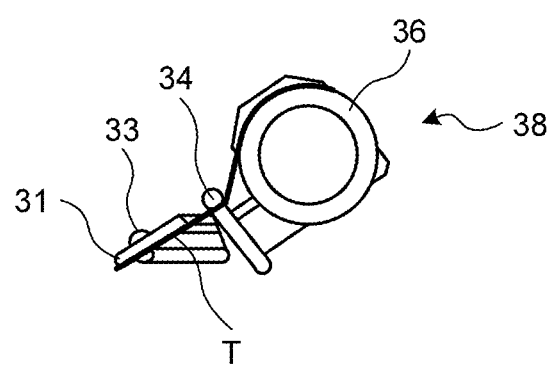
FIG. 5B is a schematic diagram illustrating the winding roller mechanism.

Next, the more detailed configuration of the left hand unit 12 will be described with reference to the above-mentioned FIGS. 3A and 3B and newly exhibited FIGS. 5A and 5B. FIG. 5A is a schematic diagram illustrating the condition of the winding roller mechanism 38 being removed from the left hand unit 12, and FIG. 5B is a schematic diagram illustrating the winding roller mechanism 38.

As illustrated in FIG. 3A, the left hand unit 12 includes a first holding mechanism 31, a cutting mechanism 32, a bracket 35, a detaching mechanism 37, the winding roller mechanism 38, and a cassette holding unit 39.

The first holding mechanism 31 is provided parallel to a feed direction of a masking tape, and is a forceps-like member formed with the leading end part thereof bent at an approximately right angle. The first holding mechanism 31 is further connected to an actuator (not depicted) at the base end part thereof, and is configured to hold a masking tape by nipping or to release it by the drive of the actuator switching to hold or to release the hold, respectively.

The cutting mechanism 32 is attached with a cutter blade 32A at the leading end thereof, and the cutting mechanism 32 slides up and down to make the cutter blade 32A enter to a masking tape at the downstream of the first holding mechanism 31 (on a feeding side of masking tape) to cut the masking tape.

The winding roller mechanism 38 is, as described above, a member to which a winding roller 36 is attached. The winding roller mechanism 38 is a mechanism that feeds a masking tape from the winding roller 36 in a given feed direction.

As illustrated in FIG. 5A, the winding roller mechanism 38 is detachable with respect to the left hand unit 12 by the detaching mechanism 37.

The winding roller mechanism 38 will now be described in more detail. As illustrated in FIG. 5B, the winding roller mechanism 38 includes the winding roller 36 attached to rotate, a guide roller 33, and a guide roller 34, and is provided to operate in conjunction with the above-described first holding mechanism 31.

The winding roller 36 is wound with a masking tape T on a core member, and the masking tape T rolled out from the winding roller 36 is guided towards the first holding mechanism 31 side while an appropriate tensile force being applied by the driven guide roller 33 and the guide roller 34. In other words, the winding roller 36, the guide roller 33, and the guide roller 34 constitute a feed mechanism of the masking tape T.

As illustrated in FIG. 3A, the cassette holding unit 39 is a tabular member secured to the bracket 35, and has an engaging part 39A formed with a bend at the end part thereof.

Explanation of a Series of Operations

Figure 6:
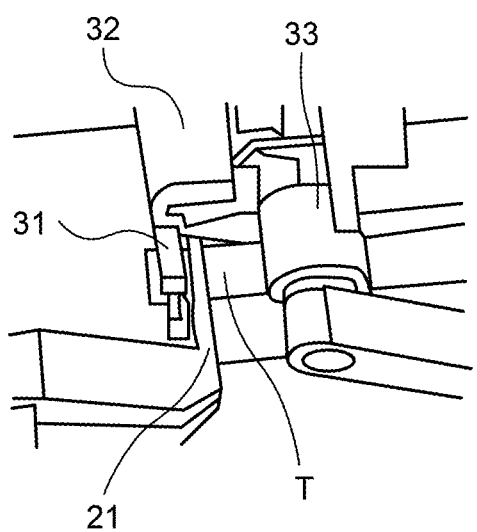
FIG. 6 is part one of schematic diagrams illustrating a series of operations in the robot system according to the embodiment.
Figure 7A:
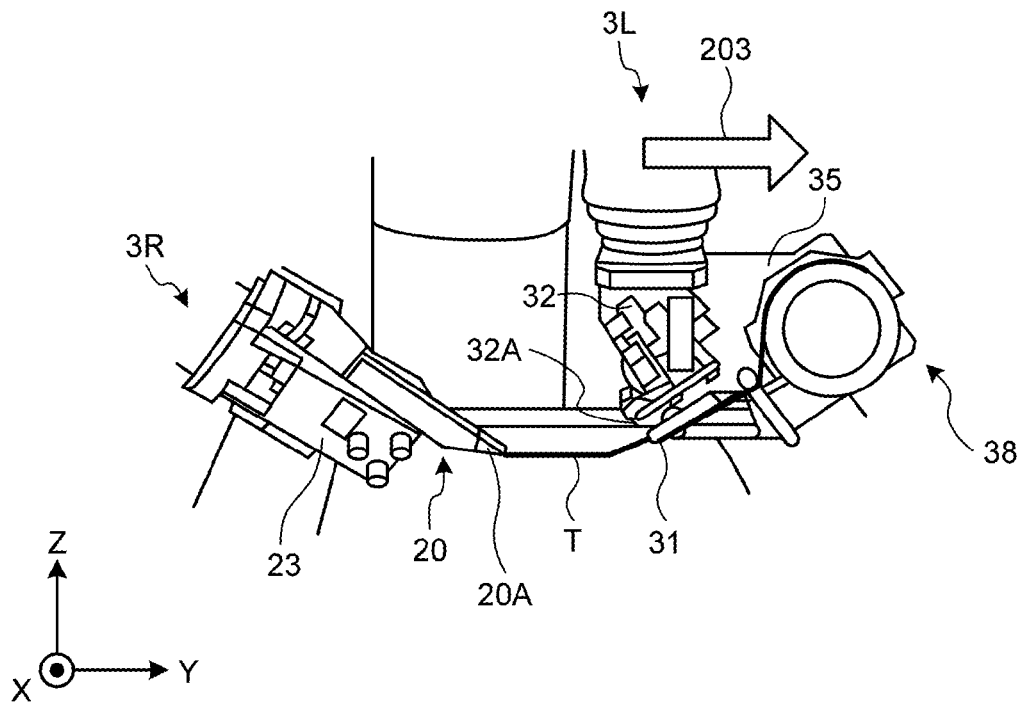
FIGS. 7A and 7B are part two of the schematic diagrams illustrating the series of operations in the robot system according to the embodiment.
Figure 7B:
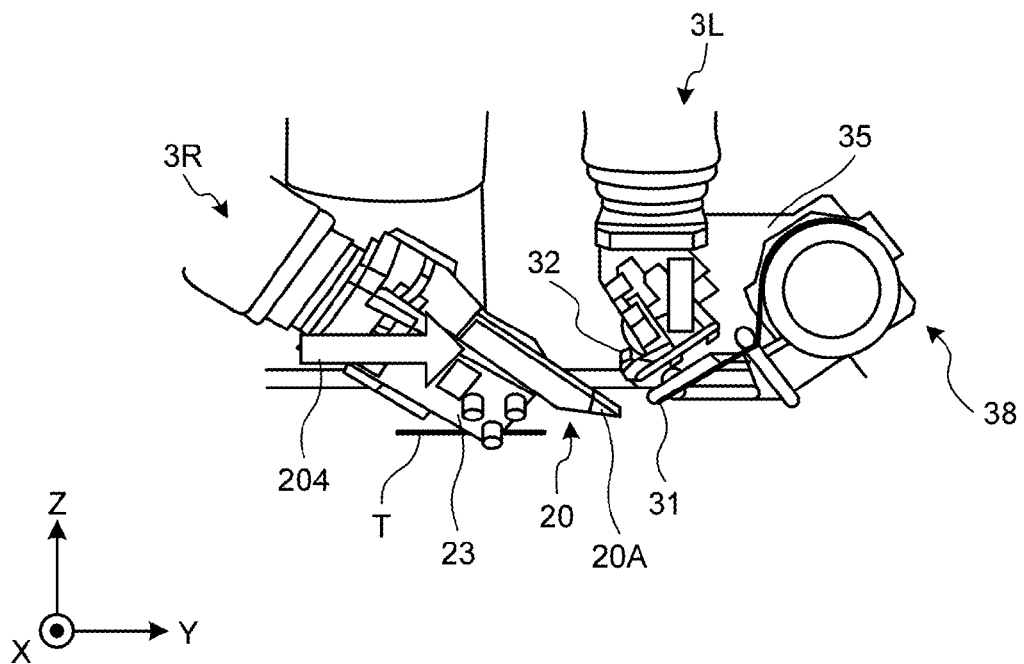

Next, with reference to the above-mentioned drawings and FIGS. 6, 7A, and 7B, a series of operations of the robot system 100 according to the embodiment will be described in detail. FIG. 6 is part one of schematic diagrams illustrating a series of operations in the robot system 100 according to the embodiment. FIGS. 7A and 7B are part two of the schematic diagrams illustrating the series of operations in the robot system 100 according to the embodiment.

The robot system 100 according to the present embodiment operates as follows in accordance with the teaching data registered in advance to the control device 108. First, before starting work, by a carrier device not depicted, the unprocessed work cassette 103 and the processed work cassette 104 are carried in to the gate 100B.

At the start of the work, the robot system 100 disposes the unprocessed work cassette 103 and the processed work cassette 104 carried in to the predetermined locations indicated in FIG. 1 by holding them with the engaging part 24A (see FIG. 3B) and the engaging part 39A (see FIG. 3A).

The robot system 100 then drives the first arm 3L to take out a top most circuit board in the unprocessed work cassette 103 by pressing the suction members 23A (see FIG. 3A), and place it on the stage 102 such that the processing surface of the circuit board faces upwards.

The robot system 100 then activates the moving member 102B and the moving member 102C (see FIG. 1) to press the circuit board against the positioning wall 102A (see FIG. 1) to complete the positioning operation of the circuit board on the stage 102. At this time, the circuit board is imaged by the camera 109 (see FIG. 1), and the type of the circuit board is identified.

Meanwhile, in parallel with the positioning operation, the first arm 3L is driven and the winding roller mechanism 38 necessary corresponding to the type of circuit board is taken out from the main stocker 105 (see FIG. 1) via the detaching mechanism 37 (see FIG. 5A). The winding roller mechanism 38 taken out is then stored in the sub-stocker 107 (see FIG. 1).

At this time, in the sub-stocker 107, a plurality of winding roller mechanisms 38 necessary for the types can be stored in advance. In the following, the winding roller mechanism 38 necessary corresponding to the type of circuit board may be described as a necessary tape.

The robot system 100 then makes the first arm 3L and the second arm 3R wait at their preset waiting positions in a given waiting posture. The waiting positions here are set at positions where the right hand unit 11 and the left hand unit 12 do not interfere with each other, for example, the positions where the right hand unit 11 is offset from the left hand unit 12 on the positive direction side of the X-axis (see FIG. 3B).

The robot system 100 then operates the second arm 3R, as illustrated in FIG. 6, to make the second holding mechanism 21 in an opened state enter between the first holding mechanism 31 and the guide roller 33, and thereafter, makes the second holding mechanism 21 close to nip a masking tape T to hold the masking tape T.

After the holding operation is completed, the robot system 100 then opens the first holding mechanism 31 to release the hold of the masking tape T by the first holding mechanism 31. Then, while the position of the first arm 3L is maintained, the robot system 100 makes the second arm 3R move towards the leading end side of the masking tape T to roll out the masking tape T for a predetermined length.

At this time, the leading end part of the second holding mechanism 21 passes through the holding unit of the first holding mechanism 31 being opened without making contact. The predetermined length of the masking tape T rolled out is based on the teaching data registered in advance. The detail of this point will be described later with reference to FIGS. 9A and 9B.

When the masking tape T is rolled out for the predetermined length, the masking tape T is held by the first holding mechanism 31 again while the hold of the masking tape T by the second holding mechanism 21 is released.

Then, the robot system 100 makes the first arm 3L move to a predetermined masking start position. As illustrated in FIG. 7A, the robot system 100 then operates the second arm 3R to press the adhesive side of the leading end portion of the masking tape T rolled out onto the circuit board with the pressing claw 20A. The predetermined masking start position is also based on the teaching data preset.

When the pressing operation of the masking tape T is completed, the robot system 100 then, as illustrated in FIG. 7A, makes both the first arm 3L and the second arm 3R move in the left-right direction for a preset length.

At this time, along with the movement of the first arm 3L, the masking tape T is rolled out from the winding roller 36. The masking tape T rolled out is then pressed onto the circuit board by the pressing claw 20A and the driven roller 20D along with the movement of the second arm 3R. In other words, the masking tape T is affixed onto the circuit board while a constant tensile force is applied, whereby the occurrence of wrinkles and such of the masking tape T can be effectively prevented.

When the movement of the first arm 3L and the second arm 3R is completed, the robot system 100 then makes the first holding mechanism 31 close and makes the cutting mechanism 32 cut the masking tape T. The robot system 100 then makes the first arm 3L retract in the left-right direction, for example, in a direction indicated by an arrow 203 in FIG. 7A.

When the masking tape T is cut, the robot system 100 then makes the second arm 3R move in the left-right direction for a preset length, as indicated by an arrow 204 in FIG. 7B, to press the masking tape T onto the circuit board up to the cut end portion of the masking tape T.

Thereafter, the robot system 100 makes the second arm 3R move at least to the above-described masking start position while a given pressing force is applied to the masking tape T by the pressing claw 20A so as to sufficiently fix the masking tape T to the circuit board.

When the affixing of the masking tape T is completed, the robot system 100 then makes the first arm 3L and the second arm 3R move to the above-described waiting positions. When the replacement of the winding roller mechanism 38 is necessary, an exchanging operation of changing the winding roller mechanism 38 into a winding roller mechanism 38 corresponding to another necessary tape stored in the sub-stocker 107 is carried out. The affixing of the masking tape T is then carried out at the masking position preset for the exchanged winding roller mechanism 38.

When affixing to all masking positions of the circuit board is completed, the robot system 100 then gives instructions to drive the second arm 3R to make the engaging part 24A (see FIG. 3B) engage with the hole of the processed circuit board, and to transfer the processed circuit board to an empty slot of the processed work cassette 104 to store it. Subsequently, the work of taking out a new unprocessed circuit board from the unprocessed work cassette 103 and affixing the masking tapes T is repeated until all unprocessed circuit boards are processed.

Explanation of Instruction Control

At the time the affixing work for a single circuit board is finished, by affixing the masking tape T of the winding roller mechanism 38 attached to the left hand unit 12 first on the subsequent circuit board, it is possible to reduce the overhead caused by exchanging the winding roller mechanisms 38.

Therefore, in the robot system 100 according to the present embodiment, the affixing work is not always carried out in a given sequence, but the instruction control is carried out to affix the masking tape T from the winding roller mechanism 38 currently attached to the left hand unit 12. This point will be explained with reference to FIGS. 8 to 14.

To make the following explanation easy to understand, as the definition of a term, the winding roller mechanism 38 attached to the left hand unit 12 may be described as a holding tape for the meaning of currently holding it.

Figure 8:
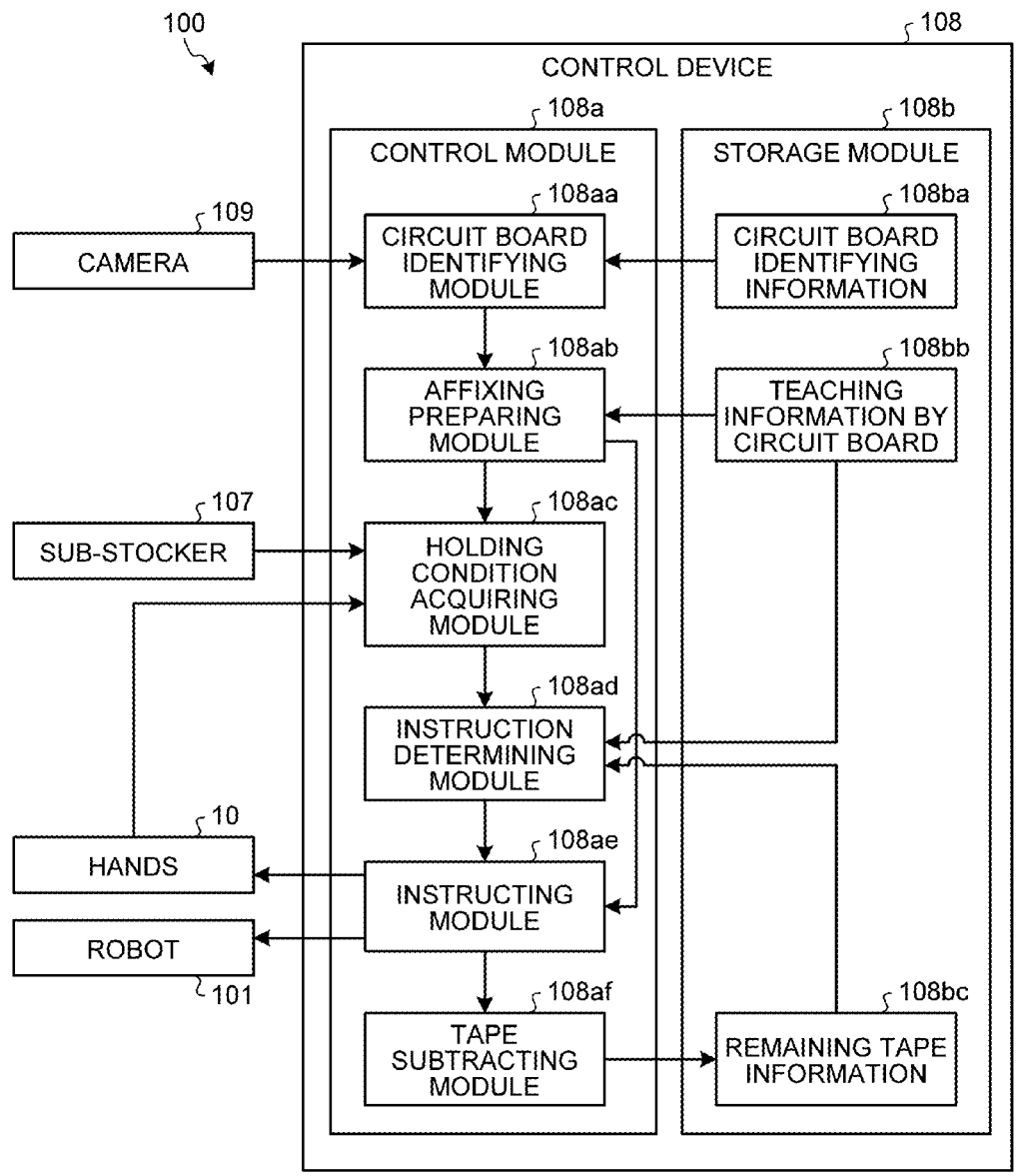
FIG. 8 is a block diagram illustrating an example of configuration of the robot system according to the embodiment.

FIG. 8 is a block diagram illustrating an example of configuration of the robot system 100 according to the embodiment. In FIG. 8, only the constituent elements necessary for explaining the instruction control of the robot system 100 are illustrated, and the description for general constituent elements is omitted.

As illustrated in FIG. 8, the robot system 100 includes the hands 10, the robot 101, the sub-stocker 107, the control device 108, and the camera 109. The description of the other constituent elements illustrated in FIG. 1 is omitted here.

The control device 108 includes a control module 108*a* and a storage module 108*b*. The control module 108*a* further includes a circuit board identifying module 108*aa*, an affixing preparing module 108*ab*, a holding condition acquiring module 108*ac*, an instruction determining module 108*ad*, the instructing module 108*ae*, and a tape subtracting module 108*af*.

The storage module 108*b* stores therein circuit board identifying information 108*ba*, teaching information by circuit board 108*bb*, and remaining tape information 108*bc*.

The hands 10, the robot 101, the sub-stocker 107, and the camera 109 have been explained already and thus, their explanations in detail are omitted here.

The control module 108*a* carries out an overall control of the control device 108. The circuit board identifying module 108*aa* receives image data of a circuit board from the camera 109 and matches the image data received to the circuit board identifying information 108*ba* to identify the type of circuit board that is a workpiece.

The circuit board identifying information 108*ba* is the information for identifying the type of circuit board such as the shape of circuit board, the positions and number of holes of the circuit board, and the like. The circuit board identifying information 108*ba* is stored in the storage module 108*b* in advance.

The circuit board identifying module 108*aa* further notifies the affixing preparing module 108*ab* of the type of circuit board identified.

The affixing preparing module 108*ab* carries out affixing preparation work based on the type of circuit board notified and the teaching information by circuit board 108*bb*. More specifically, the affixing preparing module 108*ab* notifies the later discussed instructing module 108*ae* of instructions to take out necessary tapes corresponding to the type of circuit board from the main stocker 105 (see FIG. 1) and store them in the sub-stocker 107. At this time, when there is an unnecessary tape that is not necessary with respect to a necessary tape, the affixing preparing module 108*ab* notifies of instructions to return the unnecessary tape to the main stocker 105 in addition.

In the teaching information by circuit board 108*bb*, types of necessary tapes corresponding to the type of circuit board are defined. The detail of the teaching information by circuit board 108*bb* will be described later with reference to FIG. 9B.

The affixing preparing module 108*ab* further notifies the holding condition acquiring module 108*ac* of a completion notice after the affixing preparation work is completed. The completion notice may include the presence of holding tape, the type of holding tape when the holding tape is present, a storage condition of necessary tapes in the sub-stocker 107, and such.

The holding condition acquiring module 108*ac* acquires the condition concerning a holding tape such as the presence of holding tape from the hands 10 and the condition concerning the sub-stocker 107 such as a storage condition of necessary tapes from the sub-stocker 107, and notifies the instruction determining module 108*ad*. While the acquiring of such holding condition can be realized by mounting respective detecting devices such as a pressure sensor to the hands 10 and the sub-stocker 107, it is not intended to restrict the method.

The instruction determining module 108*ad* determines instructions for the robot 101 and the hands 10 concerning affixing of the masking tape T based on the notice indicative of the holding condition received from the holding condition acquiring module 108*ac*, the teaching information by circuit board 108*bb*, and the remaining tape information 108*bc*. The instruction determining module 108*ad* then notifies the instructing module 108*ae* of the instructions determined.

Figures 9A, 9B, 9C:
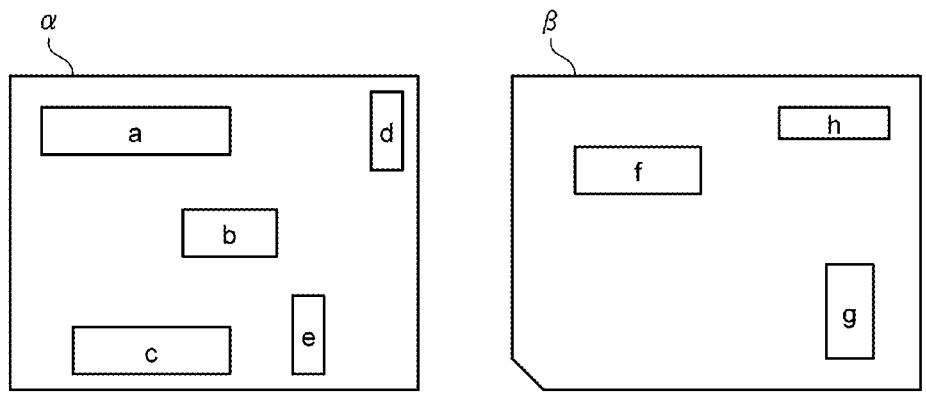
FIG. 9A is a diagram illustrating an example of difference in type of circuit board.
FIG. 9B is a table illustrating an example of teaching information by circuit board.
FIG. 9C is a table illustrating an example of remaining tape information.
Figure 10:
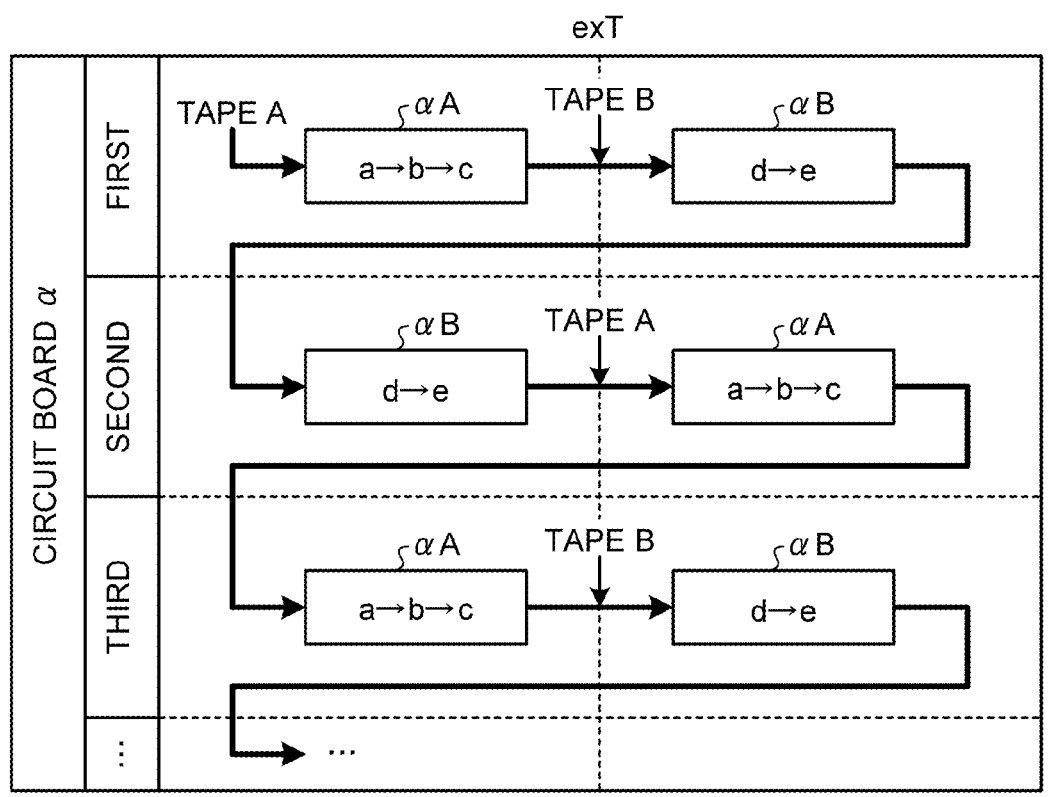
FIG. 10 is a diagram illustrating an example of an instruction control sequence in the robot system according to the embodiment.

With reference to FIGS. 9A to 9C, and 10, the contents of instructions that the instruction determining module 108*ad* determines will be described in detail. FIG. 9A is a diagram illustrating an example of difference in type of circuit board, FIG. 9B is a table illustrating an example of the teaching information by circuit board 108*bb*, and FIG. 9C is a table illustrating an example of the remaining tape information 108*bc*. FIG. 10 is a diagram illustrating an example of an instruction control sequence in the robot system 100 according to the embodiment.

As illustrated in FIG. 9A, it is assumed that there are a circuit board α and a circuit board β of different types. On the circuit board α, it is assumed that there are five points a to e for affixing the masking tape T (hereinafter, described as teaching points). Similarly, on the circuit board β, it is assumed that there are three teaching points f to h.

Between the circuit board α and the circuit board β depicted in FIG. 9A, it is assumed that, other than the respective teaching points, there is a difference in shape of whether there is a cutout at a corner. Accordingly, in the circuit board identifying information 108*ba*, defined is identifying information such as the circuit board α having no cutout at a corner thereof and the circuit board β having a cutout at a corner thereof.

Next, as illustrated in FIG. 9B, in the teaching information by circuit board 108*bb*, the information concerning teaching by type of circuit board is defined. For example, the example here indicates that the teaching information by circuit board 108*bb* includes type of necessary tape by type of circuit board, and a teaching data set by the type of necessary tape.

For example, as for the circuit board α, a tape A and a tape B are defined as the type of necessary tape. As for the tape A, a teaching data set that teaches the affixing using the tape A in a sequence starting from a teaching point a, going through a teaching point b, and then reaching a teaching point c is defined.

The teaching data set includes not only the sequence of affixing but also positions, predetermined lengths, directions of affixing, and such of the respective teaching points.

As for the tape B used for the same circuit board α, a teaching data set that teaches the affixing using the tape B in a sequence from a teaching point d to a teaching point e is defined.

Similar definitions can be applied to the circuit board β. For example, as illustrated in FIG. 9B, it is defined that the circuit board β requires two types of tapes of the tape A and a tape C as necessary tapes. A teaching data set in a sequence from a teaching point f to a teaching point g is defined for the tape A, while a teaching data set with only a teaching point h is defined for the tape C.

However, the example illustrated in FIG. 9B is not intended to restrict the configuration of the teaching information by circuit board 108*bb*. For example, by storing the information of "tape type" and "teaching data set" in a manner associated with each other as teaching information and further storing the teaching information linked with "circuit board type" as information by circuit board or information by workpiece, a configuration similar to that of the teaching information by circuit board 108*bb* may be arranged.

In the following explanation, the teaching data set indicated in FIG. 9B is given a symbol by the rule of "circuit board type+tape type". Accordingly, for example, the teaching data set for the tape A for the circuit board α indicated in FIG. 9B is given a symbol of αA.

Next, as illustrated in FIG. 9C, in the remaining tape information 108*bc*, a remaining amount of the masking tape T is stored for each tape type. For example, FIG. 9C illustrates an example of the remaining tape information 108*bc* including "tape type", "remaining amount", and "threshold" associated with one another for each "stocker holder No." indicative of an identifier for a holder of the main stocker 105. While the remaining amount and the threshold are indicated in units of millimeters (mm) here, it is not restricted to this.

The remaining amount of the remaining tape information 108*bc* is updated as appropriate by the later described tape subtracting module 108*af*. The threshold is a lower limit threshold of the remaining amount, and the tape with its remaining amount lower than threshold is replaced with that of the same type with more remaining amount in the main stocker 105.

With the assumption of the foregoing, an instruction control sequence performed in the affixing work of the robot system 100 will be described. In FIG. 10, a sequence with the circuit board α as a workpiece is illustrated.

As illustrated in FIG. 10, the robot system 100 first makes the hands 10 hold a predetermined necessary tape for the first circuit board α as a holding tape. At this time, when there is a holding tape in the hands 10 already due to work in the previous process and such and when the holding tape is a necessary tape for the circuit board α, the robot system 100 makes the hands 10 continuously hold the holding tape. It is assumed that the tape A is used as the first holding tape here.

For the first circuit board α, the instruction determining module 108*ad* first determines the teaching data set αA as instructions based on the teaching information by circuit board 108*bb*, and notifies the instructing module 108*ae* to make the instructing module 108*ae* execute the instructions.

Then, after the affixing work based on the teaching data set αA is executed, the instruction determining module 108*ad* notifies the instructing module 108*ae* of instructions to exchange the holding tape with the tape B to make the instructing module 108*ae* execute the exchange. After the exchange is completed, the instruction determining module 108*ad* subsequently determines a teaching data set αB as instructions and then makes the instructing module 108*ae* execute the instructions.

As illustrated in FIG. 10, at the step of finishing the affixing work for the first circuit board α, the hands 10 are holding the tape B as a holding tape. Accordingly, the instruction determining module 108*ad* first determines the teaching data set αB as instructions for the second circuit board α, and notifies the instructing module 108*ae* to make the instructing module 108*ae* execute the instructions. After the execution of the teaching data set αB is completed, the instruction determining module 108*ad* makes the instructing module 108*ae* exchange the holding tape with the tape A and execute the teaching data set αA.

Subsequently, in a similar sequence, the instruction determining module 108*ad* determines instructions for the robot 101 and the hands 10 while switching instructions corresponding to the type of holding tape, and the instructing module 108*ae* activates the robot 101 and the hands 10 based on the instructions.

More specifically, the robot system 100 according to the present embodiment carries out, when a plurality of masking tapes are used for processing a single circuit board, the instruction control that gives instructions to the robot 101 and the hands 10 for an operation in which the masking tape held last in the previous round of processing a circuit board is used first in the subsequent round of processing a circuit board.

Carrying out such instruction control allows, in the example illustrated in FIG. 10, for example, the exchange timing exT of holding tapes to be once per one circuit board α. In other words, as compared with a case when executing in the order of the teaching data set αA and the teaching data set αB for each single circuit board α, the number of exchange timings exT can be reduced. Consequently, the overhead by the operations of the robot 101 and the hands 10 required for exchanging holding tapes can be reduced, whereby the throughput can be increased.

While a case in which necessary tapes used by the type of circuit board are of two types is exemplified here (see FIG. 9B), the embodiment is obviously applicable even when tapes are of three types or more. In this case, for example, by defining the teaching information by circuit board 108*bb* to include executed flags, the instruction determining module 108*ad* may determine the subsequent teaching data set to be instructed based on the type of holding tape and on/off statuses of the executed flags.

Returning to the explanation with reference to FIG. 8, the instructing module 108*ae* of the control device 108 will be described. While it is mentioned in the explanation with reference to FIG. 10, the instructing module 108*ae* actually activates the robot 101 and the hands 10 based on the instructions concerning affixing the masking tape T determined by the instruction determining module 108*ad*. The instructing module 108*ae* further notifies the tape subtracting module 108*af* of the actual affixed amount of the masking tape T.

The tape subtracting module 108*af* subtracts the amount of masking tape T notified from the instructing module 108*ae* from the remaining amount of the corresponding remaining tape information 108*bc*, and updates the remaining amount of the remaining tape information 108*bc*. Accordingly, because it calculates the remaining amount, the tape subtracting module may be renamed as a remaining amount calculating module.

The storage module 108*b* is a storage device such as a hard disk drive and a non-volatile memory, and stores therein the circuit board identifying information 108*ba*, the teaching information by circuit board 108*bb*, and the remaining tape information 108*bc*. The contents of the circuit board identifying information 108*ba*, the teaching information by circuit board 108*bb*, and the remaining tape information 108*bc* have been explained already and thus, their explanations are omitted here.

The respective constituent elements illustrated in FIG. 8 may not be arranged in the single body of control device 108. For example, any of or all of the circuit board identifying information 108*ba*, the teaching information by circuit board 108*bb*, and the remaining tape information 108*bc* that are stored in the storage module 108*b* may be stored in an internal memory of the robot 101 to achieve an increase in throughput and a reduction of overhead.

Explanation of Processing Procedure

Figure 11:
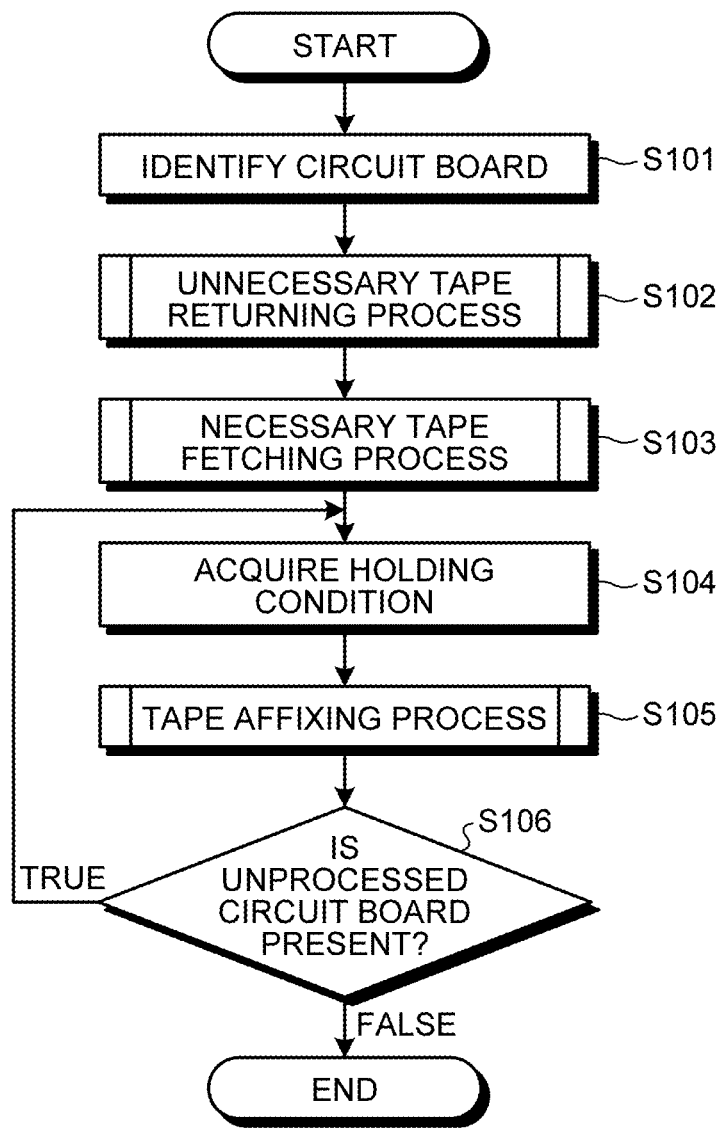
FIG. 11 is a flowchart illustrating processing procedure executed by the robot system according to the embodiment.

Next, the processing procedure executed by the robot system 100 according to the embodiment will be described with reference to FIG. 11. FIG. 11 is a flowchart illustrating processing procedure executed by the robot system 100 according to the embodiment. The following flowchart illustrates the processing procedure for one type of circuit board.

As illustrated in FIG. 11, the circuit board identifying module 108*aa* identifies the type of circuit board that is a workpiece based on image data of the camera 109 and the circuit board identifying information 108*ba* (Step S101). The affixing preparing module 108*ab* then executes an unnecessary tape returning process (Step S102) and a necessary tape fetching process (Step S103) based on the type of circuit board.

The unnecessary tape returning process and the necessary tape fetching process are the affixing preparation process carried out for each type of circuit board. The unnecessary tape returning process will be described later with reference to FIG. 12, and the necessary tape fetching process will be described later with reference to FIG. 13.

The holding condition acquiring module 108*ac* then acquires a holding condition from the hands 10 and the sub-stocker 107 (Step S104). Based on the holding condition acquired, the instruction determining module 108*ad*, the instructing module 108*ae*, and the tape subtracting module 108*af* execute tape affixing process (Step S105). The processing procedure of the tape affixing process will be described later with reference to FIG. 14.

Then, it is determined whether there is an unprocessed circuit board for one type of circuit board (Step S106), and when there is an unprocessed circuit board (True at Step S106), the processes at Step S104 and the subsequent steps are repeated. When there is no unprocessed circuit board (False at Step S106), the process is finished.

Figure 12:
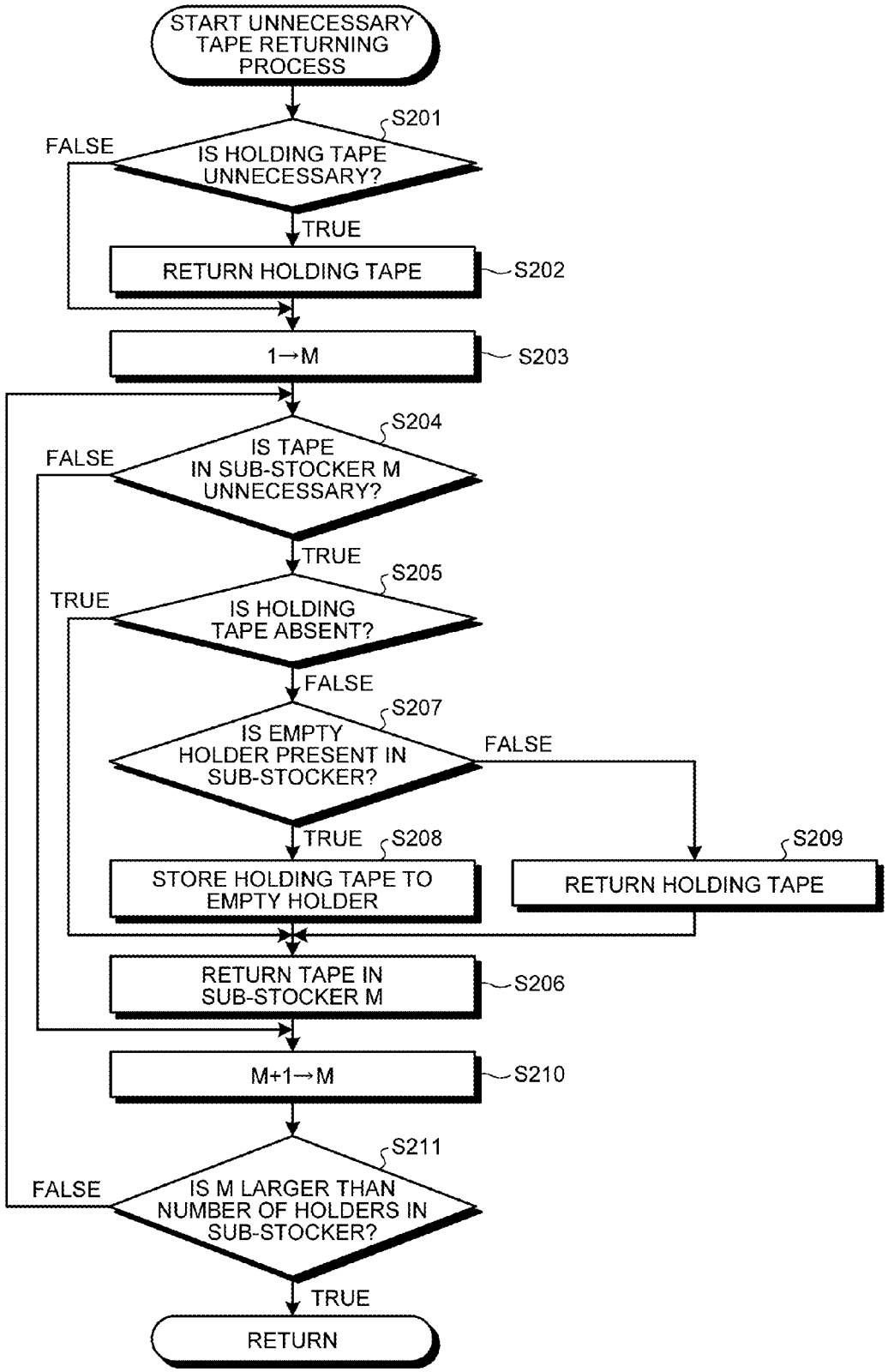
FIG. 12 is a flowchart illustrating processing procedure for unnecessary tape returning process indicated in FIG. 11.

Next, the processing procedure of the unnecessary tape returning process indicated in FIG. 11 will be described with reference to FIG. 12. FIG. 12 is a flowchart illustrating the processing procedure of the unnecessary tape returning process indicated in FIG. 11.

In FIG. 12, a variable M uniquely identifying each of the holders of the sub-stocker 107 will be used. The description of sub-stocker M means the M-th holder of the sub-stocker 107.

As illustrated in FIG. 12, the affixing preparing module 108*ab* determines whether the current holding tape is unnecessary (Step S201). When the judgment condition at Step S210 is satisfied (True at Step S201), the affixing preparing module 108*ab* sets the holding tape to be returned (Step S202). When the judgment condition at Step S201 is not satisfied (False at Step S201), the affixing preparing module 108*ab* moves the control to Step S203.

The affixing preparing module 108*ab* then sets the variable M to an initial value of 1 (Step S203), and determines whether a tape in the sub-stocker M is unnecessary (Step S204). When the judgment condition at Step S204 is satisfied (True at Step S204), the affixing preparing module 108*ab* determines whether there is no holding tape (Step S205). When the judgment condition is not satisfied (False at Step S204), the affixing preparing module 108*ab* moves the control to Step S210.

When the judgment condition at Step S205 is satisfied (True at Step S205), the affixing preparing module 108*ab* then moves the control to Step S206. When the judgment condition is not satisfied (False at Step S205), the affixing preparing module 108*ab* determines whether there is any empty holder of the sub-stocker 107 available (Step S207).

When the judgment condition at Step S207 is satisfied (True at Step S207), the affixing preparing module 108*ab* sets the holding tape to be stored in an empty holder of the sub-stocker 107 (Step S208). When the judgment condition at Step S207 is not satisfied (False at Step S207), the affixing preparing module 108*ab* sets the holding tape to be returned to the main stocker 105 (Step S209).

The affixing preparing module 108*ab* then sets the tape in the sub-stocker M to be returned to the main stocker 105 (Step S206).

Then, the affixing preparing module 108*ab* adds 1 to the variable M (Step S210), and determines whether the variable M exceeds the number of holders of the sub-stocker 107 (Step S211). When the judgment condition at Step S211 is satisfied (True at Step S211), the affixing preparing module 108*ab* finishes the process. When the judgment condition at Step S211 is not satisfied (False at Step S211), the affixing preparing module 108*ab* repeats the processes from Step S204.

Figure 13:
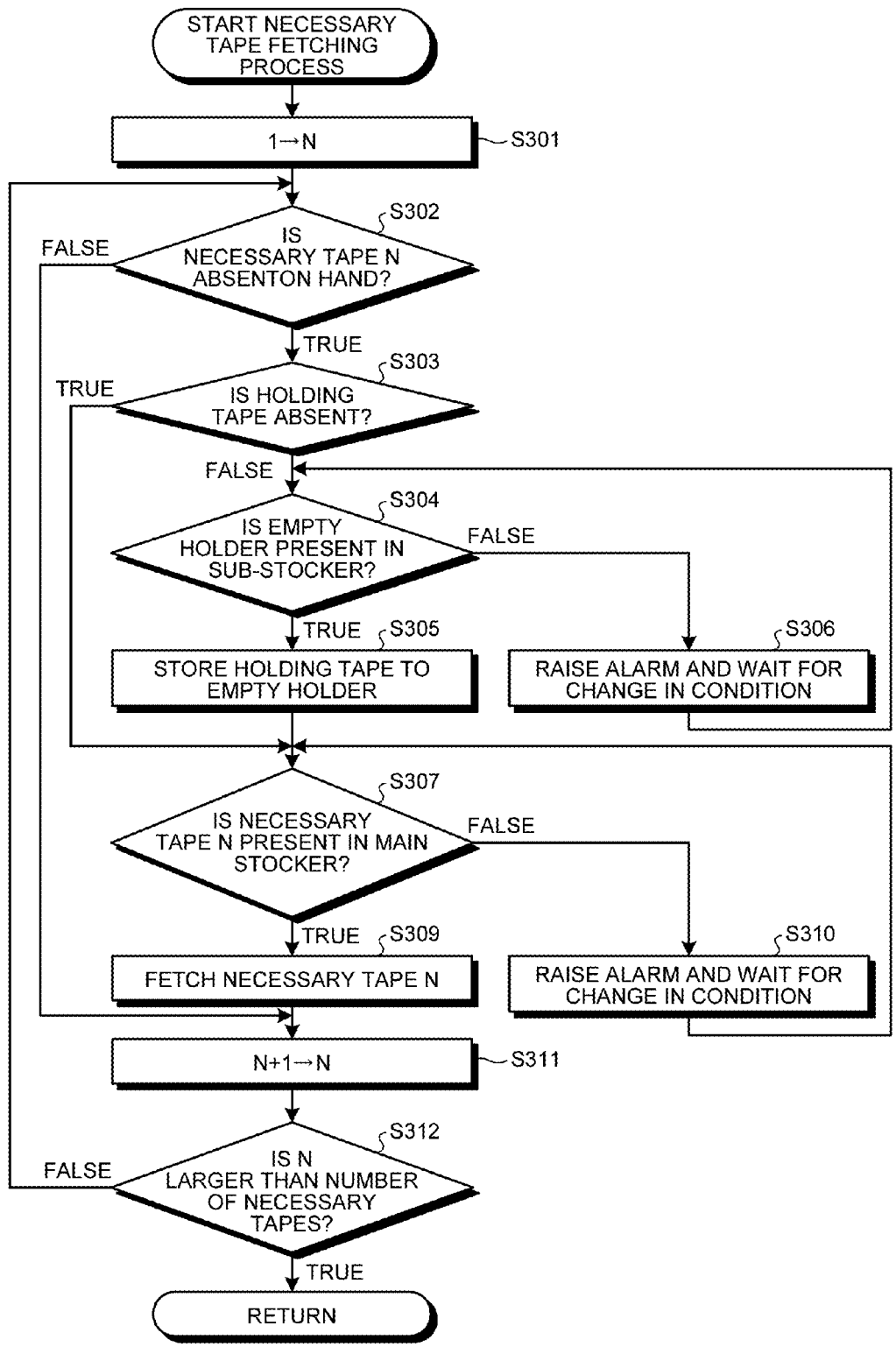
FIG. 13 is a flowchart illustrating processing procedure for necessary tape fetching process indicated in FIG. 11.

Next, the processing procedure of the necessary tape fetching process indicated in FIG. 11 will be described with reference to FIG. 13. FIG. 13 is a flowchart illustrating the processing procedure of the necessary tape fetching process indicated in FIG. 11.

In FIG. 13, a variable N uniquely identifying a necessary tape that is required for one type of circuit board will be used. The description of necessary tape N means the N-th necessary tape to be fetched.

As illustrated in FIG. 13, the variable N is set to an initial value of 1 (Step S301), and it is determined whether there is not a necessary tape N on hand (Step S302). The on hand here means both the hands 10 and the sub-stocker 107.

When the judgment condition at Step S302 is satisfied (True at Step S302), the affixing preparing module 108*ab* determines whether there is no holding tape (Step S303). When the judgment condition at Step S302 is not satisfied (False at Step S302), the affixing preparing module 108*ab* moves the control to Step S311.

When the judgment condition at Step S303 is satisfied (True at Step S303), the affixing preparing module 108*ab* moves the control to Step S307. When the judgment condition at Step S303 is not satisfied (False at Step S303), the affixing preparing module 108*ab* determines whether there is any empty holder of the sub-stocker 107 available (Step S304).

When the judgment condition at Step S304 is satisfied (True at Step S304), the affixing preparing module 108*ab* sets the holding tape to be stored in an empty holder of the sub-stocker 107 (Step S305). When the judgment condition at Step S304 is not satisfied (False at Step S304), the affixing preparing module 108*ab* raises an alarm and waits for a change in condition (Step S306), and then repeats the process from Step S304.

The affixing preparing module 108*ab* then determines whether the necessary tape N is in the main stocker 105 (Step S307). When the judgment condition at Step S307 is satisfied (True at Step S307), the affixing preparing module 108*ab* sets the necessary tape N to be fetched from the main stocker 105 (Step S309). When the judgment condition at Step S307 is not satisfied (False at Step S307), the affixing preparing module 108*ab* raises an alarm and waits for a change in condition (Step S310), and repeats the process from Step S307.

Then, the affixing preparing module 108*ab* adds 1 to the variable N (Step S311), and determines whether the variable N exceeds the number of necessary tapes (Step S312). When the judgment condition at Step S312 is satisfied (True at Step S312), the affixing preparing module 108*ab* finishes the process. When the judgment condition at Step S312 is not satisfied (False at Step S312), the affixing preparing module 108*ab* repeats the processes from Step S302.

Figure 14:
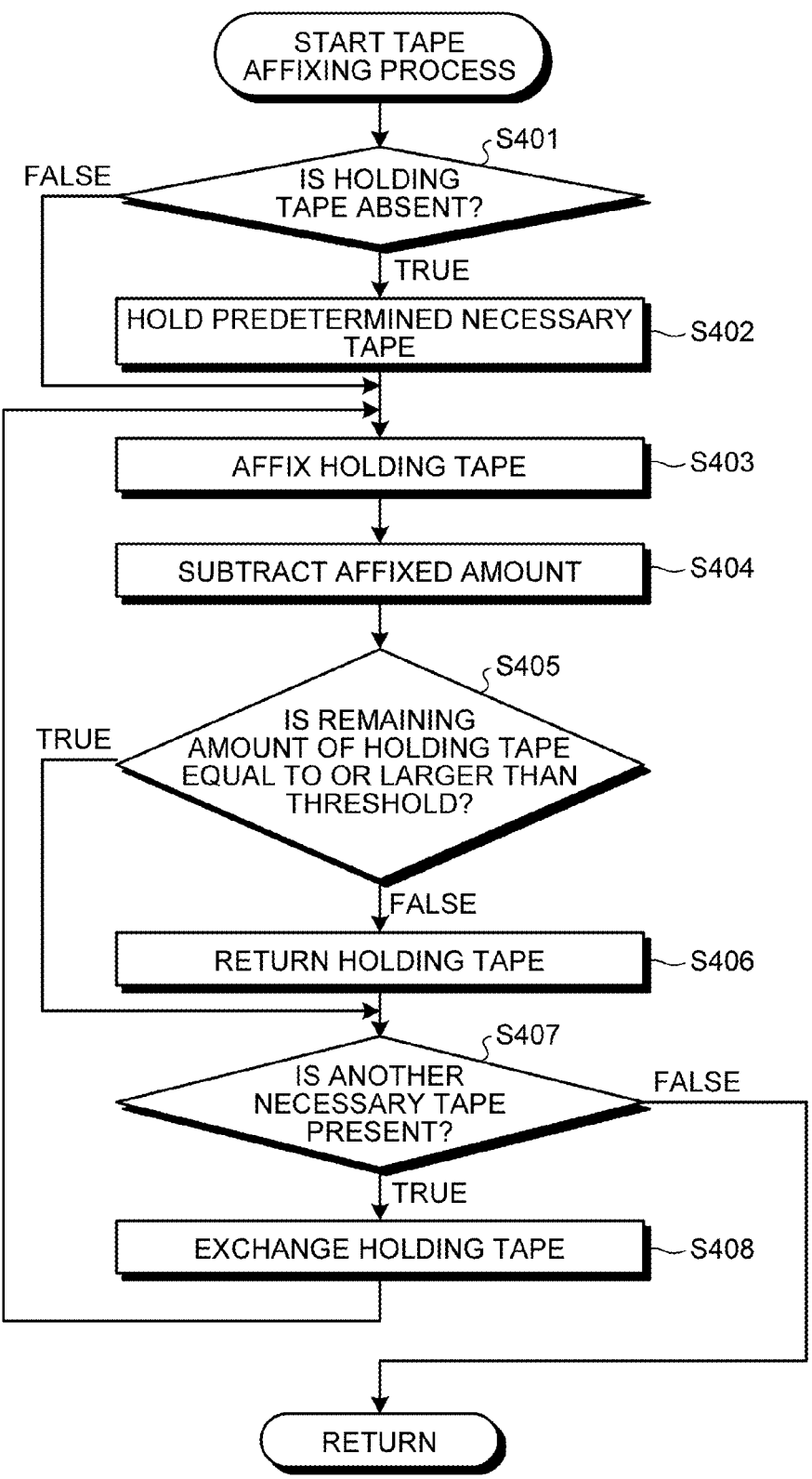
FIG. 14 is a flowchart illustrating processing procedure for tape affixing process indicated in FIG. 11.

Next, the processing procedure of the tape affixing process indicated in FIG. 11 will be described with reference to FIG. 14. FIG. 14 is a flowchart illustrating the processing procedure of the tape affixing process indicated in FIG. 11.

As illustrated in FIG. 14, the instruction determining module 108ad determines whether there is no holding tape based on the holding condition acquired by the holding condition acquiring module 108ac (Step S401). When the judgment condition at Step S401 is satisfied (True at Step S401), the instruction determining module 108ad sets a predetermined necessary tape to be held via the instructing module 108ae (Step S402). When the judgment condition at Step S401 is not satisfied (False at Step S401), the instruction determining module 108ad moves the control to Step S403.

The instruction determining module 108ad then sets affixing of the holding tape to be performed via the instructing module 108ae (Step S403). After the affixing of the holding tape is completed, the tape subtracting module 108af subtracts the amount of tape affixed (i.e., the affixed amount) (Step S404) and updates the remaining tape information 108bc.

Then, the instruction determining module 108ad determines, based on the remaining tape information 108bc, whether the remaining amount of the holding tape is a threshold or more (Step S405). When the judgment condition at Step S405 is satisfied (True at Step S405), the instruction determining module 108ad moves the control to Step S407. When the judgment condition at Step S405 is not satisfied (False at Step S405), the instruction determining module 108ad sets the holding tape to be returned via the instructing module 108ae (Step S406).

The instruction determining module 108ad then determines whether there is another necessary tape different from the holding tape (Step S407). When the judgment condition at Step S407 is satisfied (True at Step S407), the instruction determining module 108ad sets the holding tape to be exchanged via the instructing module 108ae (Step S408), and repeats the processes from Step S403. When the judgment condition at Step S407 is not satisfied (False at Step S407), the instruction determining module 108ad finishes the process.

As described in the foregoing, the robot system according to the embodiment includes a robot and an instructing module. The robot holds one of a plurality of types of feed materials used for processing a workpiece. The instructing module gives instructions to the robot, when a plurality of feed materials are used for processing a single workpiece, for an operation in which the feed material held last in the previous round of processing a workpiece is used first in the subsequent round of processing a workpiece.

Consequently, in accordance with the robot system according to the embodiment, an increase in throughput can be achieved.

While an example in which the workpiece is a circuit board for an electronic device and the masking tapes that are the feed materials are affixed to predetermined positions of the circuit board is exemplified in the above-described embodiment, it is not intended to restrict the workpiece, the feed materials, the aspect of processing, and such. For example, by defining the workpiece as a wafer and the feed material as adhesive, the disclosed technology in the present application may be applied when performing a process of applying the adhesive on the wafer.

While an example of exchanging the same type of feed materials that is masking tape is exemplified in the above-described embodiment, it is not intended to restrict as such. For example, the disclosed technology in the present application may be applied when exchanging a masking tape with adhesive and vice versa.

In the above-described embodiment, a so-called dual-arm robot is exemplified. However, it is not restricted to this and, for example, the disclosed technology in the present application may be applied when a single-arm robot performs a process to a workpiece while exchanging feed materials, or it may be applied to a robot including three arms or more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot system comprising:
a robot that holds one of a plurality of feed materials to be attached to a workpiece; and
an instructing module that gives an instruction to the robot so that the robot holds each of the feed materials in an order when the robot attaches the feed materials to a workpiece, the order being reverse to an order which the instructing module last gave for holding each of the feed materials when the robot attached the feed materials to a workpiece;
further comprising:
a storage module that stores therein teaching information including, in a manner associated with each other, a type of the feed material and teaching data for the robot prepared in advance corresponding to the type when the feed materials are attached to the workpiece; and
an acquiring module that acquires the type of the feed material the robot is holding, wherein
the instructing module acquires from the teaching information the teaching data corresponding to the type of the feed material acquired by the acquiring module and gives an instruction for an operation based on the teaching data acquired;
further comprising:
a main stocker that is provided in an area capable of being held by the robot and stores therein the feed materials; and
a sub-stocker provided at a location closer to the robot than the main stocker, wherein
the storage module further stores therein information by workpiece that is the teaching information associated with a type of the workpiece, and
the instructing module acquires a type of the feed material corresponding to the type of the workpiece from the information by workpiece, and gives an instruction for an operation that prioritizes the sub-stocker over the main stocker as a storage destination of the feed material corresponding to the type of the feed material acquired;
further comprising
a calculating module that calculates a remaining amount of the feed materials based on an amount of the feed materials used, wherein
the instructing module gives an instruction, when the remaining amount of the feed material the robot is holding falls below a given threshold, for an operation to exchange the feed material with the feed material of a same type stored in the main stocker.

2. The robot system according to claim 1, wherein
the robot is a dual-arm robot including a first hand mechanism and a second hand mechanism,
the robot system further includes:
a first storage unit that is disposed near the first hand mechanism and stores therein the workpiece before the feed materials are attached to the workpiece, a second storage unit that is disposed near the second hand mechanism and stores therein the workpiece after the feed materials are attached to the workpiece, and a stage on which the workpiece is placed when the feed materials are being attached to the workpiece, and the instructing module gives an instruction for an operation to move the workpiece from the first storage unit onto the stage using the first hand mechanism before the feed materials are attached to the workpiece and to move the workpiece from the stage onto the second storage unit using the second hand mechanism after the feed materials are attached to the workpiece.

3. The robot system according to claim 1, wherein the workpieces are each a circuit board for an electronic device, and the feed materials are each a masking tape to be affixed onto a surface of the corresponding circuit board.

4. A method of manufacturing a workpiece, the method comprising:

making a robot hold one of a plurality of feed materials to be attached to a workpiece; and giving an instruction to the robot for an operation so that the robot holds each of the feed materials in an order when the robot attaches the feed materials to a workpiece, the order being reverse to an order which an instructing module last gave for holding each of the feed materials when the robot attached the feed materials to a workpiece;

further comprising:

storing in a storage module teaching information including, in a manner associated with each other, a type of the feed material and teaching data for the robot prepared in advance corresponding to the type when the feed materials are attached to the workpiece; and acquiring, using an acquiring module, the type of the feed material the robot is holding, wherein the instructing module acquires from the teaching information the teaching data corresponding to the type of the feed material acquired by the acquiring module and gives an instruction for an operation based on the teaching data acquired;

further comprising:

providing a main stocker in an area capable of being held by the robot and stores therein the feed materials; and providing a sub-stocker at a location closer to the robot than the main stocker, wherein the storage module further stores therein information by workpiece that is the teaching information associated with a type of the workpiece, and the instructing module acquires a type of the feed material corresponding to the type of the workpiece from the information by workpiece, and gives an instruction for an operation that prioritizes the sub-stocker over the main stocker as a storage destination of the feed material corresponding to the type of the feed material acquired;

further comprising calculating, using a calculating module, a remaining amount of the feed materials based on an amount of the feed materials used, wherein the instructing module gives an instruction, when the remaining amount of the feed material the robot is holding falls below a given threshold, for an operation to exchange the feed material with the feed material of a same type stored in the main stocker.

5. A robot system comprising:

a robot that holds one of a plurality of feed materials to be attached to a workpiece; and an instructing means that gives an instruction to the robot so that the robot holds each of the feed materials in an order when the robot attaches the feed materials to a workpiece, the order being reverse to an order which the instructing means last gave for holding each of the feed materials when the robot attached the feed materials to a workpiece;

further comprising:

a storage module that stores therein teaching information including, in a manner associated with each other, a type of the feed material and teaching data for the robot prepared in advance corresponding to the type when the feed materials are attached to the workpiece; and an acquiring module that acquires the type of the feed material the robot is holding, wherein the instructing means acquires from the teaching information the teaching data corresponding to the type of the feed material acquired by the acquiring module and gives an instruction for an operation based on the teaching data acquired;

further comprising:

a main stocker that is provided in an area capable of being held by the robot and stores therein the feed materials; and a sub-stocker provided at a location closer to the robot than the main stocker, wherein the storage module further stores therein information by workpiece that is the teaching information associated with a type of the workpiece, and the instructing means acquires a type of the feed material corresponding to the type of the workpiece from the information by workpiece, and gives an instruction for an operation that prioritizes the sub-stocker over the main stocker as a storage destination of the feed material corresponding to the type of the feed material acquired;

further comprising a calculating module that calculates a remaining amount of the feed materials based on an amount of the feed materials used, wherein the instructing means gives an instruction, when the remaining amount of the feed material the robot is holding falls below a given threshold, for an operation to exchange the feed material with the feed material of a same type stored in the main stocker.

* * * * *